United States Patent [19]

Matsuzaki et al.

[11] Patent Number: 6,072,120
[45] Date of Patent: Jun. 6, 2000

[54] METHOD OF PREVENTING GALLOPING OF MULTICONDUCTOR TRANSMISSION LINES

[75] Inventors: Yutaka Matsuzaki; Jun Katoh; Takeo Munakata, all of Tokyo, Japan

[73] Assignee: The Furukawa Electric Co., Ltd., Tokyo, Japan

[21] Appl. No.: 08/806,705

[22] Filed: Feb. 27, 1997

Related U.S. Application Data

[63] Continuation of application No. 08/376,968, Jan. 23, 1995, abandoned.

[30] Foreign Application Priority Data

Jan. 26, 1994 [JP] Japan .................................... 6-023707

[51] Int. Cl.[7] .................................................. H02G 7/14
[52] U.S. Cl. ........................................ 174/42; 174/129 R
[58] Field of Search ................................ 174/42, 129 R, 174/40 R, 40 TD, 43, 45 R, 146, 148, 149 R

[56] References Cited

FOREIGN PATENT DOCUMENTS

| | | | |
|---|---|---|---|
| 4-295220 | 10/1992 | Japan ........................................ | 174/42 |
| 495739 | 3/1976 | U.S.S.R. ................................. | 174/146 |
| 669440 | 6/1979 | U.S.S.R. ................................. | 174/146 |

OTHER PUBLICATIONS

Bonneville Power Administration, "Transmission Line Reference Book HVDC To +–600kv", pp12–13, No Month, 1977.

*Primary Examiner*—Hyung Sub Sough
*Attorney, Agent, or Firm*—Armstrong, Westerman, Hattori, McLeland & Naughton

[57] ABSTRACT

A top phase transmission line and bottom phase transmission line are stretched between support steel towers so that the bottom phase transmission line is positioned below the top phase transmission line. Each of the transmission lines has at least two conductors, which conductors are arranged to be substantially parallel and are separated by a substantially constant distance by interconductor spacers. An intermediate phase transmission line may be arranged between the top phase transmission line and bottom phase transmission line as well. Such transmission lines are multiconductor transmission lines. In these multiconductor transmission lines, the conductor positioned at the left side in the top phase transmission line and the conductor positioned at the right side in the intermediate phase transmission line or bottom phase transmission line directly below it are connected by a first interphase spacer made of an insulator. Further, the conductor positioned at the right side in the top phase transmission line and the conductor positioned at the left side in the intermediate phase transmission line or bottom phase transmission line directly below it are connected by a second interphase spacer made of an insulator. By this, galloping in the transmission lines can be suppressed.

21 Claims, 9 Drawing Sheets

AMPLITUDE OF VIBRATION : 3.51m (P-P)
ANGLE OF TORSION : 104° (P-P)
PERIOD OF VIBRATION : 2.8 sec
PHASE DIFFERENCE BETWEEN
 UPWARD AND DOWNWARD TORSION : 60°
GALLOPING IN LINE OF 810mm² × 4 CONDUCTORS

METHOD OF PREVENTING GALLOPING OF MULTICONDUCTOR TRANSMISSION LINES

This application is a continuation of application Ser. No. 08/376,968, filed Jan. 23, 1995, now abandoned.

BACKGROUND OF THE INVENTION

1. Field of the Invention

The present invention relates to a method of suppressing galloping of multiconductor transmission lines.

2. Description of the Related Art

If ice forms in a wing-shaped manner on the upwind side of an overhead transmission line, a wind from substantially horizontal direction will create a lift, which will cause the line to vibrate vertically and induce "galloping" of a self-oscillation of about 0.1 Hz to 1 Hz. When the wind is strong, this galloping causes the line to vibrate with mainly a large vertical motion with some horizontal motion. The maximum vertical amplitude of this vertical motion becomes as large as 10 meters. This large vertical motion of the lines sometimes causes lines above and below each other to come into contact and therefore causes short-circuits between them.

This galloping will be explained with reference to FIG. 1, which is a vertical sectional view of a transmission line in the line direction (longitudinal direction). In FIG. 1, if ice 4 forms in a wing-shaped manner on the upwind side of a conductor 2 of an overhead transmission line at the position α and this is struck by a horizontal wind, the wind causes a lift at the wing of ice 4 and the conductor 2 rises to the position β. When rising, the conductor 2 is twisted in the clockwise direction and the ice 4 turns upward as shown at the position β. At the position β, a further lift is caused by the wind at the upward turning ice 4 formed on the conductor 2 and so the conductor 2 rises to the position γ. After rising to the position γ in the figure, the conductor 2 descends to the position δ due to the elasticity of the conductor. At this time, the conductor is twisted in the counterclockwise direction, the ice 4 turns downward as shown at the position δ, the conductor 4 with the downward turning ice 4 descends to the lowest limit position ε due to the wind, then once again rises. As a result, the conductor 2 engages in repeated torsion and vertical motion. As mentioned above, the line engages in a torsional vibration wherein a further upward force acts on the line when rising and a further downward force acts on it when descending. Accordingly, the vertical motion of the conductor 2 develops into large galloping.

This galloping occurs more easily in a multiconductor transmission line than a single conductor transmission line. In the case of four conductors, for example, spacers 6 are attached between the four conductors 2a to 2d as shown in FIG. 2, which is a vertical sectional view in the direction of the transmission line. At the position a in FIG. 2, when ice 4 forms in a wing-shaped manner on the upwind sides of the conductors 2a, 2b, 2c, and 2d of the four-conductor transmission line 2A and these are struck by a horizontal wind, the wind causes a lift which causes the transmission line 2A to rise and twist in the clockwise direction. Accordingly, the wings of ice 4 turn upward, the lift caused by the wind increases, and the transmission line 2A rises from the position a to the position β. Next, the four-conductor transmission line 2A descends, the conductors 2a to 2d are twisted in the counterclockwise direction, and the wings of ice 4 turn downward, whereupon the wind causes a downward force and the line descends from the position β to the positions γ and δ. Next, the line rises from the position δ to the positions α and β. That is, the four-conductor transmission line 2A engages in repeated torsion and vertical vibration. As mentioned earlier, the line engages in torsional vibration wherein a further upward force acts on the line when rising and a further downward force acts on it when descending. Accordingly, the vertical motion of the transmission line 2A develops into a large galloping.

FIG. 3 shows the results of measurement of the vertical displacement, horizontal displacement, and torsional displacement of conductors caused by such galloping in the case of a four-conductor transmission line with a sectional area of conductors of 810 mm². The torsional vibration and the vertical vibration match in vibration periods, but are slightly deviated in phase.

To prevent this galloping, it is possible to attach anti-vibration dampers to the line, but dampers are not sufficient by themselves to prevent large galloping of a multiconductor transmission line. Therefore, to prevent short-circuits between a top phase line and bottom phase line due to galloping, interphase spacers made of insulating materials, such as ceramic insulators, are attached between the top phase line and bottom phase line. For example, as shown in FIG. 4, in the case of a double-conductor transmission line, an interphase spacer 10 made of an insulating material is attached between the spacer 8a of the top two conductors 2B, 2B and the spacer 8b of the bottom two conductors 2C, 2C.

As the insulating material forming such a conventional interphase spacer 10, in general use is made of a ceramic insulator. Since an interphase spacer 10 is long in length, it is necessary that the ceramic insulator spacer 10 not break when subjected to the compressive load from the two lines at the two ends of the spacer 10. Therefore, the spacer 10 has to be made thick in diameter. If thick interphase spacers 10 are attached, however, the weight of the ceramic insulator interphase spacers 10 attached to the transmission lines as a whole becomes greater, which invites an increase in the tension on the lines and an increase in the strain of the lines at the point of attachment of the interphase spacers. The steel towers therefore become insufficient in strength and require reinforcement and therefore extra trouble is entailed. Accordingly, use has been made of plastic interphase spacers with small weights rather than ceramic insulator spacers 10, but the weight of the interphase spacers as a whole has still not sufficiently been reduced.

The galloping causes the lines to twist and adds to the vertical motion. If the torsional vibration and the vertical vibration match in frequency, they develop into galloping of a large amplitude. Accordingly, it was not possible in the past to effectively prevent the occurrence of large amplitude galloping even if dampers were provided to prevent twisting of the lines. That is, in the related art, it was not possible to effectively prevent torsional vibration causing large galloping aggravating the vertical vibration of the lines.

SUMMARY OF THE INVENTION

The present invention has as its object to provide an apparatus which can solve this problem and hold down the torsion of the line so as to suppress the galloping of the multiconductor transmission line and make the interphase spacer lighter in weight.

To achieve the above object, the method of suppressing galloping of a multiconductor transmission line according to a first aspect of the present invention comprises the steps of connecting a top left conductor positioned at the left side in a top phase transmission line and a bottom right conductor positioned at the right side in a bottom phase transmission line by a first interphase spacer made of an insulator; and connecting a top right conductor positioned at the right side in the top phase transmission line and a bottom left conductor positioned at the left side in the bottom phase transmission line by a second interphase spacer made of an insulator.

The method of suppressing galloping of a multiconductor transmission line according to a second aspect of the present invention comprises the steps of connecting a top left conductor positioned at the left side in a top phase transmission line and an intermediate right conductor positioned at the right side in an intermediate phase transmission line by a first interphase spacer made of an insulator; connecting a top right conductor positioned at the right side in the top phase transmission line and an intermediate left conductor positioned at the left side in the intermediate phase transmission line by a second interphase spacer made of an insulator; connecting the intermediate left conductor and a bottom right conductor positioned at the right side in a bottom phase transmission line by a third interphase spacer made of an insulator; and connecting the intermediate right conductor and a bottom left conductor positioned at the left side in the bottom phase transmission line by a fourth interphase spacer made of an insulator.

The method of suppressing galloping of a multiconductor transmission line according to a third aspect of the present invention comprises the step of connecting a top left group of conductors positioned at the left side in a top phase transmission line and a bottom right group of conductors positioned at the right side in a bottom phase transmission line by a first interphase spacer made of an insulator; and connecting a top right group of conductors positioned at the right side in the top phase transmission line and a bottom left group of conductors positioned at the left side in the bottom phase transmission line by a second interphase spacer.

The method of suppressing galloping of a multiconductor transmission line according to a fourth aspect of the present invention comprises the step of connecting a top left group of conductors positioned at the left side in a top phase transmission line and an intermediate right group of conductors positioned at the right side in an intermediate phase transmission line by a first interphase spacer made of an insulator; connecting a top right group of conductors positioned at the right side in the top phase transmission line and an intermediate left group of conductors positioned at the left side in the intermediate phase transmission line by a second interphase spacer made of an insulator; connecting the intermediate left group of conductors and a bottom right group of conductors positioned at the right side in a bottom phase transmission line by a third interphase spacer made of an insulator; and connecting the intermediate right group of conductors and a bottom left group of conductors positioned at the left side in the bottom phase transmission line by a fourth interphase spacer made of an insulator.

The method of suppressing galloping of a multiconductor transmission line according to a fifth aspect of the present invention comprises the step of connecting a bottom group of conductors positioned at the bottom side in a first phase transmission line and a top group of conductors positioned at the top side in a second phase transmission line by a first interphase spacer made of an insulator; and connecting a top group of conductors positioned at the top side in the first transmission line and a bottom group of conductors positioned at the bottom side in the second phase transmission line by a second interphase spacer.

Preferably, the first to fourth interphase spacers are formed by integrally molding a polymer insulator around a fiber reinforced plastic rod.

Preferably, the first interphase spacer and the second interphase spacer are attached separated from each other to give an distance between the interphase spacers of 0.5 to 5 meters along the direction of the transmission lines; the third interphase spacer and the fourth interphase spacer are attached separated from each other to give an distance between the interphase spacers of 0.5 to 5 meters along the direction of the transmission lines; and the second interphase spacer and the third interphase spacer are attached separated from each other to give an distance between the interphase spacers of at least 10 meters along the direction of the transmission lines.

The ends of the first to fourth interphase spacers may be connected through mounting adapters made of an insulator to the group of conductors.

More than four interphase spacers may be arranged between support steel tower along the transmission lines.

Note that in the present invention, the multiple conductors of the multiconductor transmission line means at least two conductors. Further, in the present invention, the left side, right side, top side and bottom side are based on a view from the direction perpendicular to the conductors. In the following description, the wind flows from the left side to the right side.

According to the method of the present invention for suppressing galloping of a multiconductor transmission line, if wind strikes the multiconductor transmission lines, the left side conductor of the transmission line arranged at the top phase tries to move the transmission line clockwise due to the lift by the ice formed on the conductor, that force is transmitted through the interphase spacer to the conductor at the right side of the transmission line arranged at the bottom phase and tries to turn the bottom phase transmission line in the counterclockwise direction.

Similarly, if wind strikes the multiconductor transmission lines, the left side conductor of the transmission line arranged at the bottom phase tries to move the transmission line clockwise due to the lift by the ice formed on the conductor, that force is transmitted through the interphase spacer to the conductor at the right side of transmission line arranged at the top and tries to turn the top phase transmission line in the counterclockwise direction.

As a result, the directions of rotation of the two adjoining transmission lines become opposite to each other and the lifts acting on the wings of ice formed on the conductors of the two transmission lines due to wind from the same direction become opposite in direction as well. These lifts therefore act through the interphase spacers in a direction to cancel each other out.

In this way, the interphase spacers attached by the method according to the present invention make the force potentially causing galloping to occur at a top or bottom phase transmission line act in a direction suppressing the galloping potentially occurring at the bottom or top phase transmission line. As a result, forces act to suppress galloping at both the transmission lines and no galloping of the transmission lines develops.

Further, the insulator interphase spacers may be formed by integrally molding a polymer insulator around a fiber reinforced plastic rod. And the insulator interphase spacers may flex with respect to compressive load and need only be of a strength enough to enable transmission of the force causing galloping (lift or downward force), acting on the top or bottom phase transmission line, to the bottom or top phase transmission line. Accordingly, use may be made of light weight, inexpensive interphase spacers.

DESCRIPTION OF THE PREFERRED EMBODIMENTS

An embodiment of the present invention will be explained below with reference to the drawings.

Figure 1:
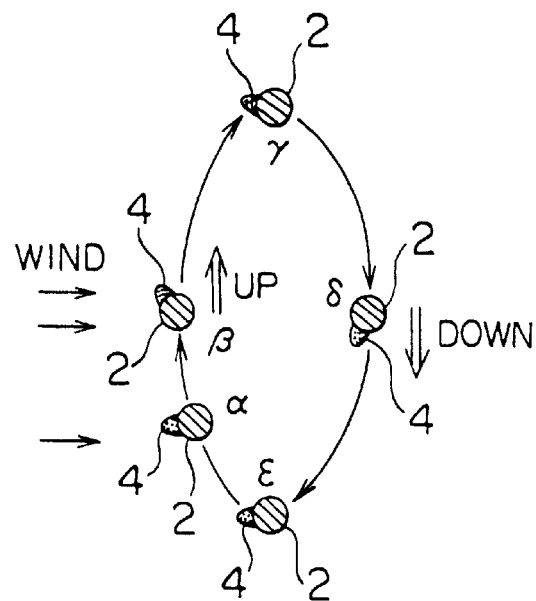
FIG. 1 is a schematic view for explaining the galloping in the case of a single-conductor transmission line of the related art of the present invention.
Figure 2:
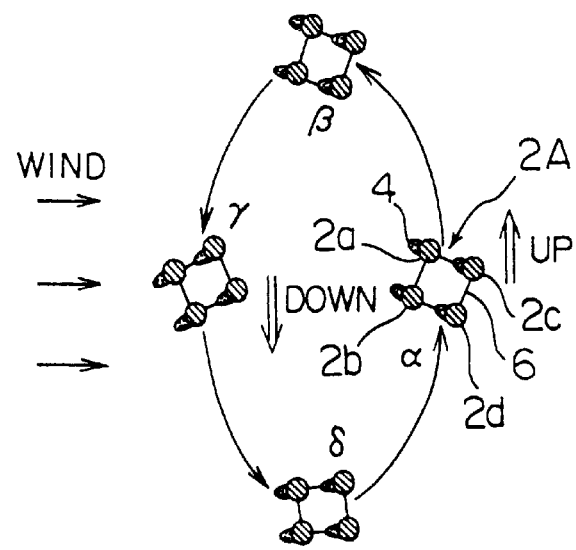
FIG. 2 is a schematic view for explaining the galloping in the case of a multiconductor transmission line of the related art of the present invention.
Figure 3:
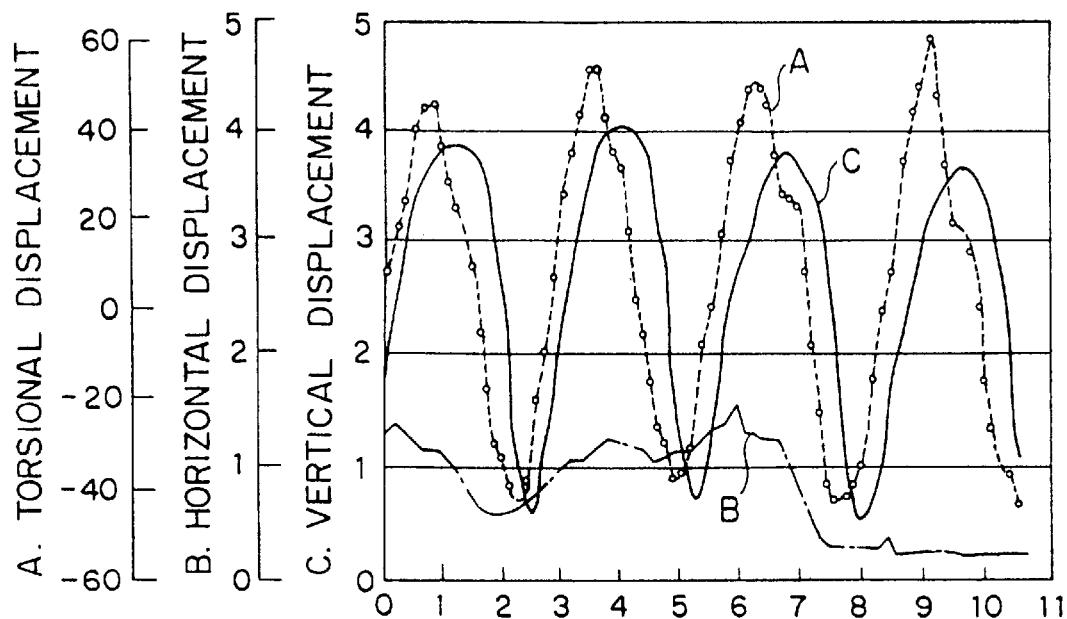
FIG. 3 is a graph of the results of measurement of galloping.
Figure 4:
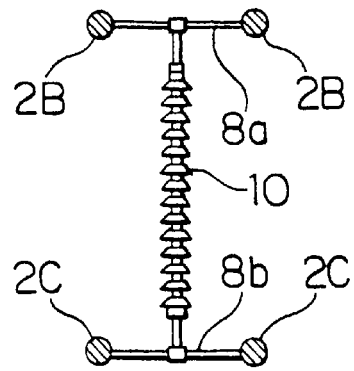
FIG. 4 is a schematic view showing a method of attachment of an interphase spacer made of an insulator in the related art of the present invention.
Figure 5:
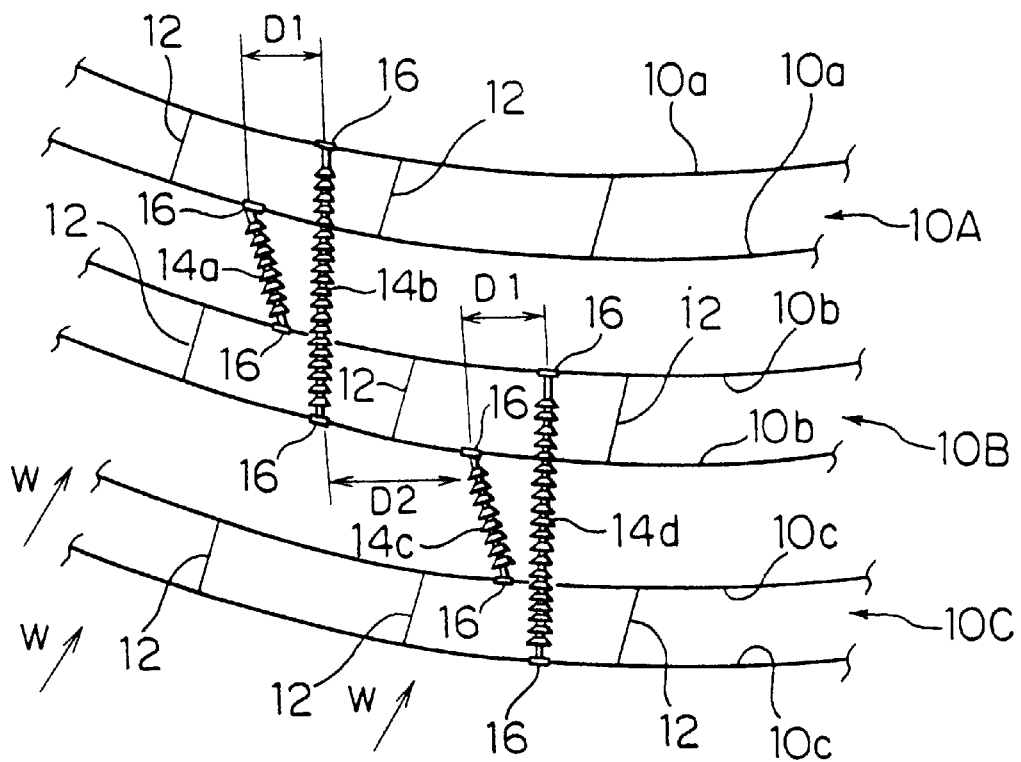
FIG. 5 is a perspective view showing the method of suppression of galloping of multiconductor transmission lines according to an embodiment of the present invention.

In the embodiment, as shown in FIG. 5, a top phase transmission line 10A, an intermediate phase transmission line 10B, and a bottom phase transmission line 10C are extended between support steel towers, not shown, in that order from the top down. These transmission lines are multiconductor transmission lines and each have two conductors 10a, 10b, and 10c, respectively. In each transmission lines, interconductor spacers 12 are arranged between the two conductors 10a, 10b, and 10c, 10c so that these conductors do not contact each other.

The length of the interconductor spacers 12 is not particularly limited, but for example is about 0.4 to 0.6 meters. The interconductor spacers 12 are arranged at distances of about 25 to 50 meters along the longitudinal direction of the conductors 10a, 10b, and 10c. The vertical distance between the different phase transmission lines 10A, 10B, and 10C is set to a distance so that the lines do not come into contact and yet are not too far from each other. The distance is not particularly limited, but for example may be 3 to 15 meters.

Figure 6:
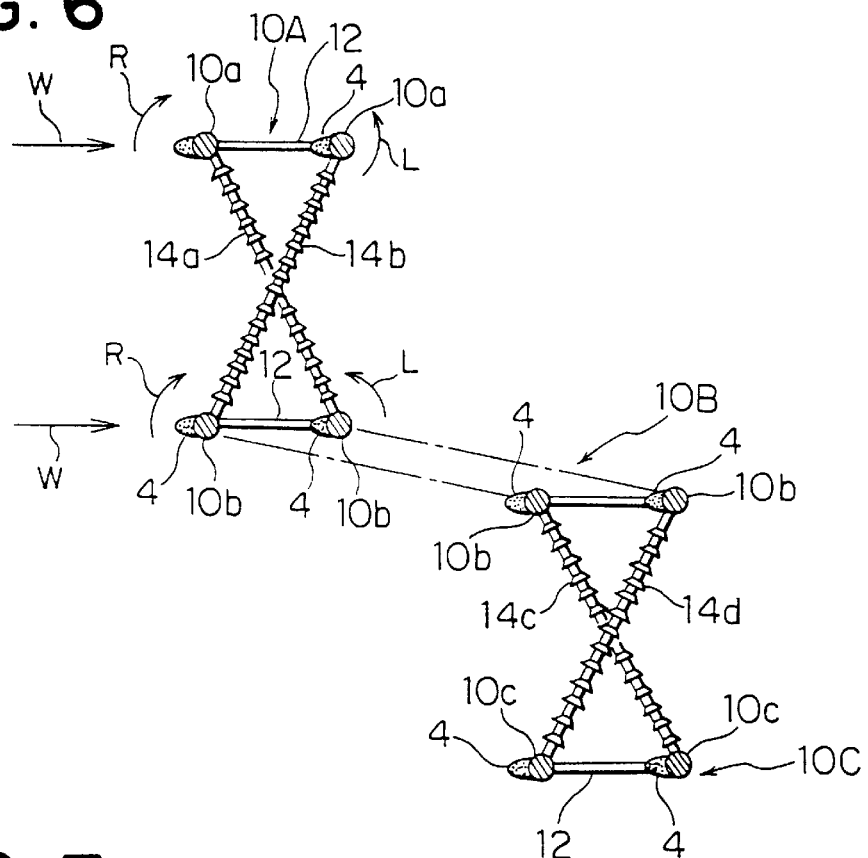
FIG. 6 is a schematic view showing key portions in the method of suppression of galloping of multiconductor transmission lines according to the same embodiment.

In the embodiment, as shown in FIGS. 5 and 6, the conductor 10a positioned at the left side (direction facing into the wind W) in the top phase transmission line 10A and the conductor 10b positioned at the right side (direction facing away from the wind W) in the intermediate phase transmission line 10B are connected by a first interphase spacer 14a made of an insulator. Further, the conductor 10a positioned at the right side in the top phase transmission line 10A and the conductor 10b positioned at the left side in the intermediate phase transmission line 10B are connected by a second interphase spacer 14b made of an insulator.

Further, the conductor 10b positioned at the left side in the intermediate phase transmission line 10B and the conductor 10c positioned at the right side in the bottom phase transmission line 10C are connected by a third interphase spacer 14c made of an insulator. Further, the conductor 10b positioned at the right side in the intermediate phase transmission line 10B and the conductor 10c positioned at the left side in the bottom phase transmission line 10C are connected by a fourth interphase spacer 14d made of an insulator.

If these interphase spacers 14a to 14d are viewed from the direction perpendicular to the length of the line, then as shown in FIG. 6, the first interphase spacer 14a and the second interphase spacer 14b intersect each other at an angle between the top and intermediate phase transmission lines 10A and 10B and the interphase spacers 14c and 14d intersect each other at an angle between the intermediate and bottom phase transmission lines 10B and 10C.

In this embodiment, as shown in FIG. 5, the first interphase spacer 14a and the second interphase spacer 14b are attached at a distance so that the distance D1 between the interphase spacers along the direction of the transmission line becomes 0.5 to 5 meters. Further, the third interphase spacer 14c and the fourth interphase spacer 14d are attached at a distance so that the distance D1 between the interphase spacers along the direction of the transmission line becomes 0.5 to 5 meters. Further, the second interphase spacer 14b and the third interphase spacer 14c are attached at a distance so that the distance D2 between the interphase spacers along the direction of the transmission line becomes at least 10 meters. This distance is provided so that the spacers do not come into contact with each other. Further, by making the distance D2 at least 10 meters, the conductors 10b of the intermediate phase transmission line 10B are kept from being subjected to unreasonable force. Note that from the viewpoint of suppression of galloping, it is preferable that the distance between the spacers not be made any greater than necessary.

Note that in FIGS. 5 and 6, the wind W blows from a single direction approximately perpendicular to the conductors 10a, 10b, and 10c along the longitudinal direction of the interconductor spacers 12, but if there is wind having a vector component substantially parallel to the longitudinal direction of the interconductor spacers 12, that direction may be opposite as well. Even when wind blows in the opposite direction, the only difference is that the upwind and downwind direction are switched. There is no change in the method of attachment of the interphase spacers 14a to 14d.

In this embodiment, the first to fourth interphase spacers 14a to 14d are all made of the same material and the same construction. Details of these interphase spacers will be explained taking as an example the first interphase spacer shown in FIG. 7.

Figure 7:
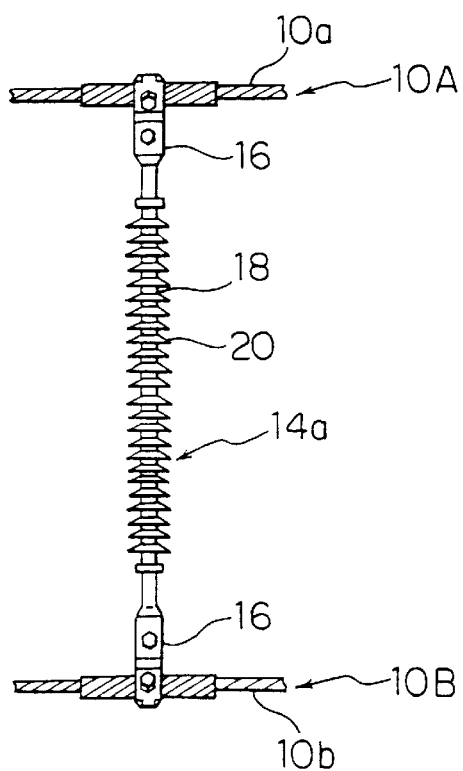
FIG. 7 is a front view for explaining the interphase spacer shown in FIGS. 5 and 6.

As shown in FIG. 7, the first interphase spacer 14a is an interphase spacer of component insulators. It is provided with a fiber reinforced plastic (FRP) rod as the tension member and a plastic insulator portion such as silicone rubber integrally molded around the FRP rod 18. At the outer surface of the insulator portion, an weather sheds 20 extending along the leakage path is provided. At the top and bottom ends of the spacer 14a, attachment portions 16, 16 are provided. The attachment portions 16 are attached to the outer circumference of the conductors 10a, 10b, and 10c by bolts etc.

Such component insulator type interphase spacers 14a have FRP rods 18 of a tensile stress strength of as much as 100 kg/mm² or more. For example, with a rod of an outer diameter of about 10 mm, the tensile strength is as much as about 8 tons. Further, even if the two ends of the interphase spacer 14a are subjected to a compressive load from the conductors 10a, 10b, and 10c, the interphase spacer 14a will just flex, not break, so may be made smaller in diameter, and is flexible and light in weight. Accordingly, this are optimal as the spacer used in the method of suppression of galloping of multiconductor transmission lines of the present embodiment.

Further, instead of using an FRP rod as the core of the interphase spacer 14a, it is possible to use a bundle of thin FRP rods to make the insulator interphase spacer or to make the interphase spacer out of a rope-like insulator made by twisting together Kevlar fibers etc. and providing the weather sheds 20 on the same. This enables a more inexpensive and lighter weight anti-galloping interphase spacer to be obtained.

In this embodiment, as shown in FIG. 6, if wind strikes the multiconductor transmission lines, the left side conductor 10a of the top phase transmission line 10A tries to move the transmission line clockwise R due to the lift by the ice 4 formed on the conductor, that force is transmitted through the interphase spacer 14a to the conductor 10b at the right side of the intermediate phase transmission line and tries to turn the intermediate phase transmission line 10b in the counterclockwise direction L.

Similarly, if wind strikes the multiconductor transmission lines, the left side conductor 10b of the intermediate phase transmission line 10B tries to move the transmission line clockwise due to the lift by the ice formed on the conductor 10b, that force is transmitted through the interphase spacer 14b to the conductor 10a at the right side of the top phase transmission line 10A and tries to turn the top phase transmission line 10A in the counterclockwise direction L.

As a result, the directions of rotation of the two adjoining transmission lines 10A and 10B become opposite to each other and the lifts acting on the wings of ice 4 formed on the conductors of the two transmission lines due to wind from the same direction become opposite in direction as well. These lifts therefore act through the interphase spacers 14a and 14b in a direction to cancel each other out.

Note that even if the rotational force or movement force acting on the conductors 10a and 10b at the left side due to the wind W are opposite, the same action is caused.

In this way, the interphase spacers 14a and 14b attached by the method according to the present invention make the force potentially causing galloping to occur at the top or bottom phase transmission line act in a direction suppressing the galloping potentially occurring at the bottom or top phase transmission phase line. As a result, forces act to suppress galloping at both the transmission lines 10A and 10B and no galloping of the transmission lines develops. Note that a similar action of suppressing galloping occurs between the intermediate and bottom phase transmission lines 10B and 10C connected by the interphase spacers 14c and 14d as well.

Further, the insulator interphase spacers 14a to 14d may flex with respect to compressive load and need only be of a strength enough to enable transmission of the force causing galloping (lift or downward force), acting on the top or bottom phase transmission line, to the bottom or top phase transmission line. Accordingly, use may be made of light weight, inexpensive interphase spacers.

Next, an explanation will be made of other embodiments of the present invention.

Figure 8:
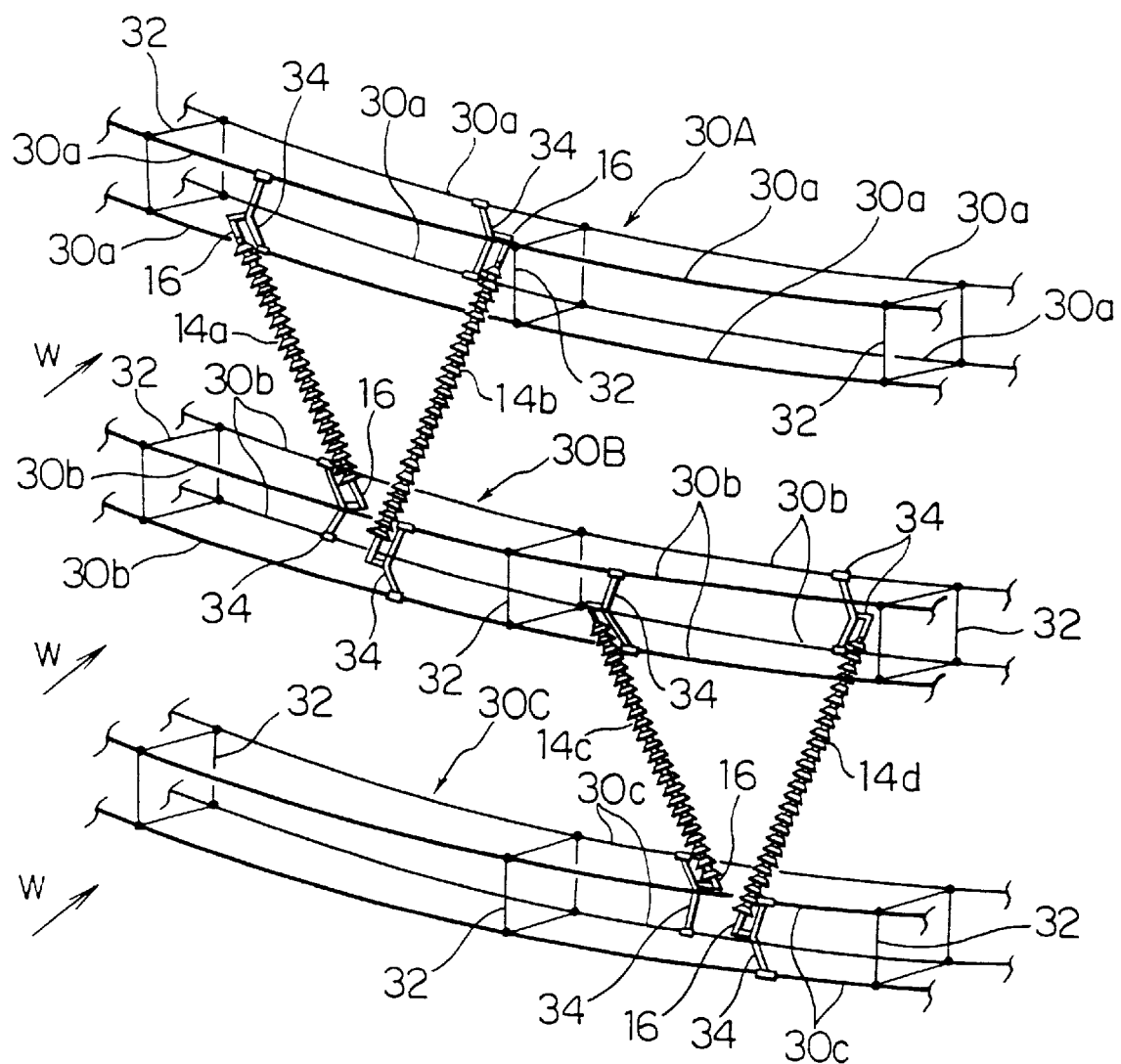
FIG. 8 is a perspective view showing the method of suppression of galloping of a multiconductor transmission line according to another embodiment of the present invention.
Figure 9:
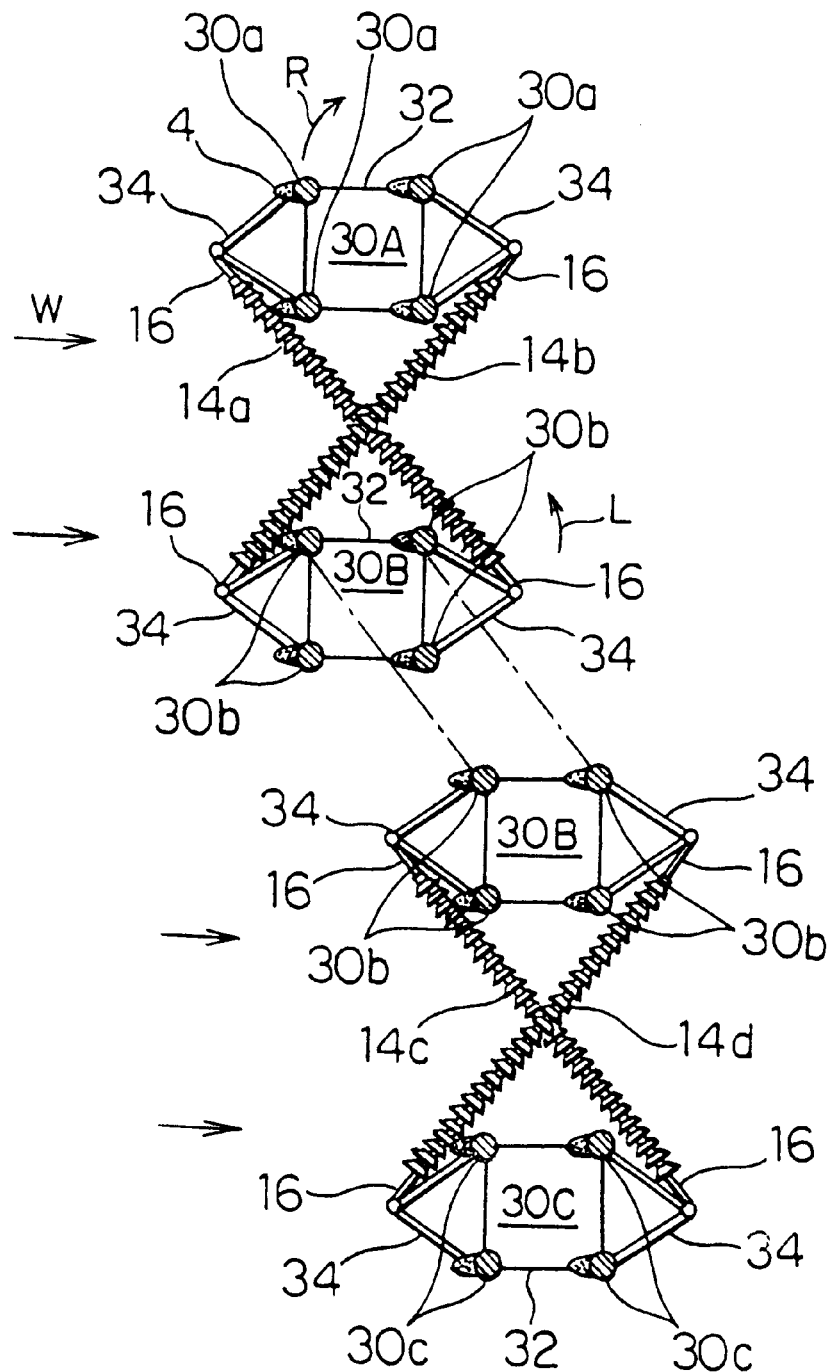
FIG. 9 is a schematic view showing key portions in the method of suppression of galloping of multiconductor transmission lines according to the same embodiments

FIGS. 8 and 9 show a second embodiment of the application of the present invention to a four-conductor (multiconductor) transmission line. In this second embodiment, the groups of conductors of the top, intermediate, and bottom phase multiconductor transmission lines, each having four conductors, are each divided into two groups of the left side and right side from a view perpendicular to the length direction of the conductors. In the following description, the wind blows from the left side to the right side.

Interphase spacer adapters are attached between the left side groups and right side groups and the interphase spacers are attached to these as explained below.

This will be explained in further detail below.

As shown in FIGS. 8 and 9, a top phase transmission line 30A, an intermediate phase transmission line 30B, and a bottom phase transmission line 30C are extended between support steel towers, not shown, in that order from the top down. These transmission lines are multiconductor transmission lines and each have four conductors 30a, 30b, and 30c, respectively. In each of the transmission lines, interconductor spacers 32 are arranged to form a square among the four conductors 30a, 30b, and 30c so that these conductors do not contact each other.

The length of the interconductor spacers 32 is not particularly limited, but for example is about 0.4 to 1.2 meters. The interconductor spacers 32 are arranged at distances of about 25 to 50 meters along the longitudinal direction of the conductors 30a, 30b, and 30c. The vertical distance between the different phase transmission lines 30A, 30B, and 30C is set to a distance so that the lines do not come into contact and yet are not too far from each other. The distance is not particularly limited, but for example may be 5 to 15 meters.

In the embodiment, the conductors 30a, 30b, and 30c forming the different transmission lines 30A, 30B, and 30C, respectively, are divided into the left side groups of conductors and right side groups of conductors. In the following description, the wind "W" blows from the left side to the right side. These groups of conductors are connected by adapters 34. The positions of attachment of these adapters 34 correspond to the positions of attachment of the interphase spacers 14a to 14d.

That is, in the embodiment, as shown in FIGS. 8 and 9, the group of conductors 30a positioned at the left side in the top phase transmission line 30A and the conductor 30b positioned at the right side in the intermediate phase transmission line 30B are connected by a first interphase spacer 14a through an adapter 34. Further, the group of conductors 30a positioned at the right side in the top phase transmission line 30A and the group of conductors 30b positioned at the left side in the intermediate phase transmission line 30B are connected through an adapter 34 by a second interphase spacer 14b.

Further, the group of conductors 30b positioned at the left side in the intermediate phase transmission line 30B and the group of conductors 30c positioned at the right side in the bottom phase transmission line 30C are connected through an adapter 34 by a third interphase spacer 14c. Further, the group of conductors 30b positioned at the right side in the intermediate phase transmission line 30B and the group of conductors 30c positioned at the left side in the bottom phase transmission line 30C are connected through an adapter 34 by a fourth interphase spacer 14d.

If these interphase spacers 14a to 14d are viewed from the line direction, then as shown in FIG. 9, the first interphase spacer 14a and the second interphase spacer 14b intersect each other at an angle between the top and intermediate phase transmission lines 30A and 30B and the interphase spacers 14c and 14d intersect each other at an angle between the intermediate and bottom phase transmission lines 30B and 30C. Note that the adapters 34 and the two ends of the spacers 14a to 14d are connected using bolts for example.

In this embodiment, the distance between the first interphase spacer 14a and the second interphase spacer 14b, the distance between the third interphase spacer 14c and the fourth interphase spacer 14d, and the distance between the second interphase spacer 14b and the third interphase spacer 14c are similar to those of the embodiment shown in FIGS. 5 and 6.

Note that in FIGS. 8 and 9, the wind W blows from a single direction approximately perpendicular to the conductors 30a, 30b, and 30c, but that direction may be opposite as well. Even when wind blows in the opposite direction, the only difference is that the downwind and upwind direction are switched. There is no change in the method of attachment of the interphase spacers 14a to 14d.

In this embodiment, the first to fourth interphase spacers 14a to 14d are all made of the same material and the same construction. They have a similar construction as the interphase spacer of the embodiment shown in FIGS. 5 and 6.

In this embodiment, as shown in FIG. 9, if wind strikes the multiconductor transmission lines, the left side group of conductors 30a of the top phase transmission line 30A tries to move the transmission line clockwise R due to the lift by the ice 4 formed on the group of conductors, that force is transmitted through the interphase spacer 14a to the group of conductors 30b at the right side of the intermediate phase transmission line and tries to turn the intermediate phase transmission line 30B in the counterclockwise direction L.

Similarly, if wind strikes the multiconductor transmission lines, the left side group of conductors 30b of the intermediate phase transmission line 30B tries to move the transmission line clockwise due to the lift by the ice formed on the group of conductors 30b, that force is transmitted through the interphase spacer 14b to the group of conductors 30a at the right side of the top phase transmission line 30A and tries to turn the top phase transmission line 30A in the counterclockwise direction L.

As a result, the directions of rotation of the two adjoining transmission lines 30A and 30B become opposite to each other and the lifts acting on the wings of ice 4 formed on the groups of conductors of the two transmission lines due to wind from the same direction become opposite in direction as well. These lifts therefore act through the interphase spacers 14a and 14b in a direction to cancel each other out.

Note that even if the rotational force or movement force acting on the groups of conductors 30a and 30b at the left side due to the wind W are opposite, the same action is caused.

In this way, the interphase spacers 14a and 14b attached by the method according to the present invention make the force potentially causing galloping to occur at the top or bottom phase transmission line act in a direction suppressing the galloping potentially occurring at the bottom or top phase transmission line. As a result, forces act to suppress galloping at both the transmission lines 30A and 30B and no galloping of the transmission lines develops. Note that a similar action of suppressing galloping occurs between the intermediate and lower phase transmission lines 30B and 30C connected through the adapters 34 by the interphase spacers 14c and 14d as well.

Figure 10:
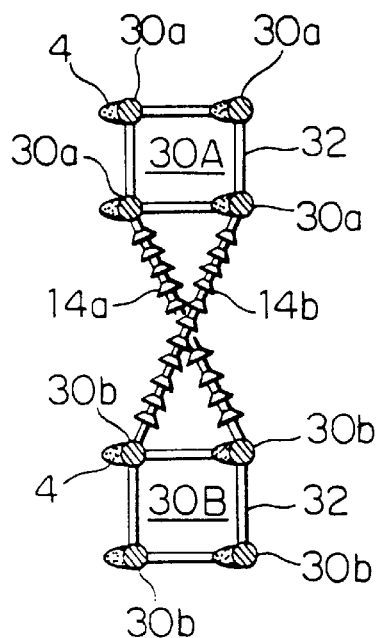
FIGS. 10 and 11 are schematic views showing key portions in methods of suppression of galloping of multiconductor transmission lines according to other embodiments of the present invention.
Figure 11:
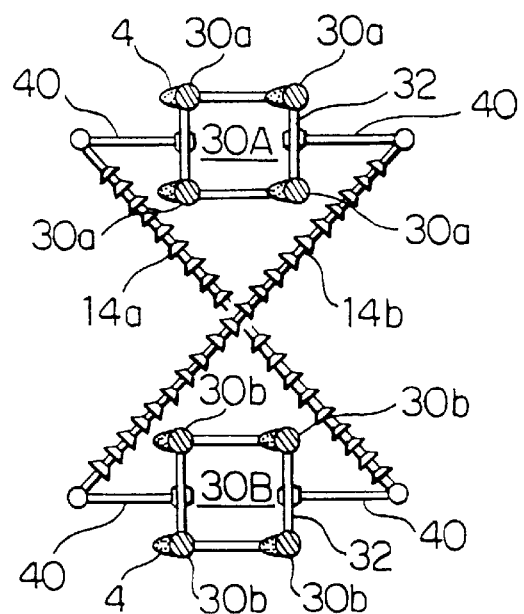

FIGS. 10 and 11 show still another embodiments of the present invention.

In the embodiment shown in FIG. 10, the case is shown of four transmission lines. The single conductor 30a positioned at the left side in the top phase transmission line 30A and the single conductor 30b positioned at the right side in the intermediate phase transmission line 30B are connected directly by the first interphase spacer 14a without going through an adapter 34 etc. Further, the single conductor 30a positioned at the right side of the top phase transmission line 30A and the single conductor 30b positioned at the left side in the intermediate phase transmission line 30B are connected directly by a second interphase spacer 14b without going through an adapter 34. Note that while not shown, the relation between the intermediate phase transmission line and the bottom phase transmission line is similar to the example shown in FIG. 10 or FIGS. 8 and 9.

Even with the method of suppression of galloping according to this embodiment, it is possible to obtain the effect of suppression of galloping the same as in the above embodiments.

In the embodiment shown in FIG. 11, the two ends of the interphase spacer 14a and 14b are connected through an arm 40 to an interconductor spacer 32. The arm is different from the adapter 34 shown in FIG. 9. If the interconductor spacer 32 is already attached to the position where the interphase spacer 14a or 14b is to be attached, only the arm 40 is additionally attached to the interconductor spacer 32 for attaching the interphase spacer 14a or 14b. If the interconductor spacer 32 does not exist at the position where the interphase spacer 14a or 14b is to be attached, the interconductor spacer 32 and the arm 40 are additionally attached to the conductors 30a or 30b for attaching the interphase spacer 14a or 14b.

As a result, in this embodiment, the group of conductors 30a positioned at the left side in the top phase transmission line 30A and the group of conductors 30b positioned at the right side in the intermediate phase transmission line 30B are connected through the arm 40 and interphase spacer 32 by a first interphase spacer 14a. Further, the group of conductors 30a positioned at the right side of the top phase transmission line 30A and the group of conductors 30b positioned at the left side in the intermediate phase transmission line 30B are connected through the arm 40 and interconductor spacer 32 by a second interphase spacer 14b.

Note that while not shown, the relation between the intermediate phase transmission line and the bottom phase transmission line is similar to the example shown in FIG. 10, FIG. 11, or FIGS. 8 and 9.

Even with the method of suppression of galloping according to this embodiment, it is possible to obtain the effect of suppression of galloping the same as in the above embodiments.

Figure 12:
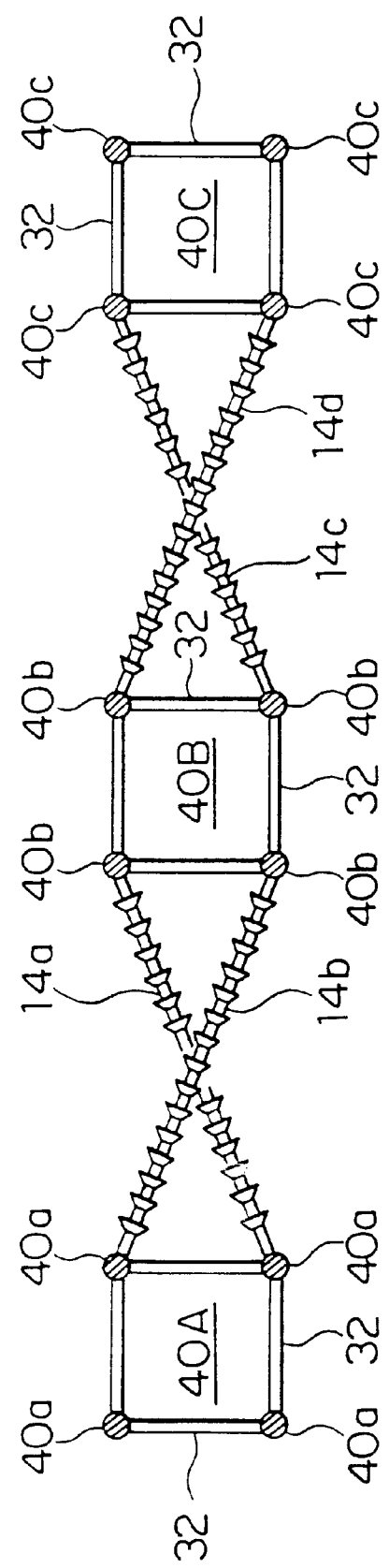
FIGS. 12 and 13 are schematic views showing key portions in methods of suppression of galloping of multiconductor transmission lines according to other embodiments of the present invention.

In the embodiment shown in FIG. 12, the groups of conductors of a first, second, and third phase multiconductor transmission lines 40A, 40B and 40C, each having four conductors 40a, 40b and 40c are arranged substantially in the horizontal direction between support steel towers, not shown. Each of the lines are divided into two groups of the top side and bottom side from a view perpendicular to the length direction of the conductors.

In each of the transmission lines, interconductor spacers 32 are arranged to form a square among the four conductors 40a, 40b, and 40c so that these conductors do not contact each other.

In this embodiment, at least one of the conductors 40a positioned at the bottom side in the first phase transmission line 40A and at least one of the conductor 40b positioned at the top side in the second phase transmission line 40B are connected directly or through adapter 34 shown in FIG. 9 and the like by the first interphase spacer 14a. Further, at least one conductor 40a positioned at the top side of the first phase transmission line 40A and at least one conductor 40b positioned at the bottom side in the second phase transmission line 40B are connected directly or through adapter 34 shown in FIG. 9 and the like by a second interphase spacer 14b.

Further, at least one of the conductors 40b positioned at the bottom side in the second phase transmission line 40B and at least one of the conductor 40c positioned at the top side in the third phase transmission line 40C are connected directly or through adapter 34 shown in FIG. 9 and the like by the third interphase spacer 14c. Furthermore, at least one conductor 40b positioned at the top side of the second phase transmission line 40B and at least one conductor 40c positioned at the bottom side in the third phase transmission line 40C are connected directly or through adapter 34 shown in FIG. 9 and the like by a fourth interphase spacer 14d.

Even with the method of suppression of galloping according to this embodiment, it is possible to obtain the effect of suppression of galloping the same as in the above embodiments.

Figure 13:
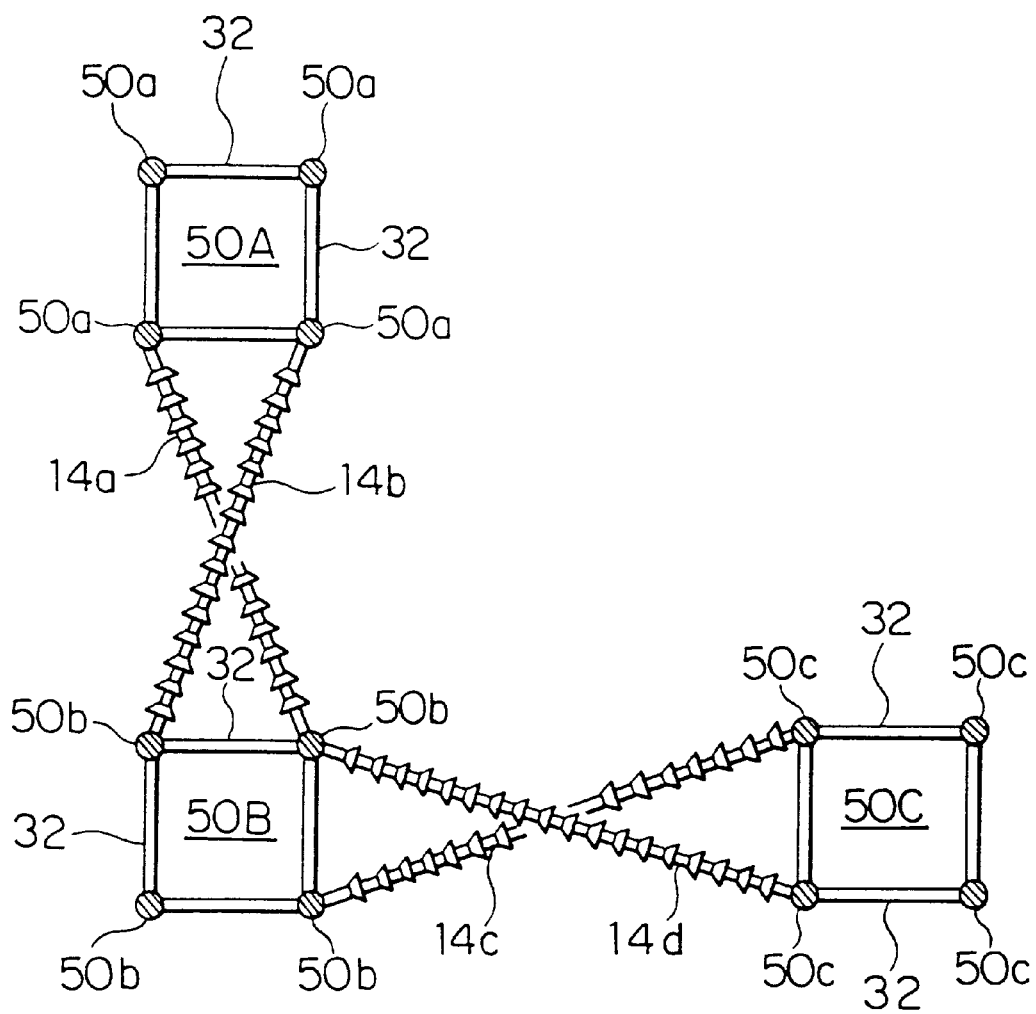

In the embodiment shown in FIG. 13, each of a first, second, and third phase multiconductor transmission lines 50A, 50B and 50C, has four conductors 50a, 50b and 50c. The first phase line 50A is arranged over the second phase line 50B and the third phase line 50C is arranged substantially in the horizontal direction with respect to the second phase line 50C between support steel towers not shown.

In each of the transmission lines, interconductor spacers 32 are arranged to form a square among the four conductors 50a, 50b, and 50c so that these conductors do not contact each other.

In this embodiment, at least one of the conductors 50a positioned at the left side in the first phase transmission line 50A and at least one of the conductor 50b positioned at the right side in the second phase transmission line 50B are connected directly or through adapter 34 shown in FIG. 9 and the like by the first interphase spacer 14a. Further, at least one conductor 50a positioned at the right side of the first phase transmission line 50A and at least one conductor 50b positioned at the left side in the second phase transmission line 50B are connected directly or through adapter 34 shown in FIG. 9 and the like by a second interphase spacer 14b.

Further, at least one of the conductors 50b positioned at the bottom side in the second phase transmission line 50B and at least one of the conductor 50c positioned at the top side in the third phase transmission line 50C are connected directly or through adapter 34 shown in FIG. 9 and the like by the third interphase spacer 14c. Furthermore, at least one conductor 50b positioned at the top side of the second phase transmission line 50B and at least one conductor 40c positioned at the bottom side in the third phase transmission line 50C are connected directly or through adapter 34 shown in FIG. 9 and the like by a fourth interphase spacer 14d.

Even with the method of suppression of galloping according to this embodiment, it is possible to obtain the effect of suppression of galloping the same as in the above embodiments.

Note that the present invention is not limited to the above embodiments and may be modified in various ways within the spirit of the invention.

For example, in the above embodiments, illustration was made of three multiconductor transmission lines, but the invention is not limited to this. The invention may also be applied to two or four or more vertically and/or horizontally arranged transmission lines.

While the invention has been particularly shown and described in reference to preferred embodiments thereof, it will be understood by those skilled in the art that changes in form and details may be made therein without departing from the spirit and scope of the invention.

What is claimed is:

1. A method of suppressing galloping of a multiconductor transmission line, comprising the steps of:

connecting a top left conductor positioned at the left side in a top phase transmission line and a bottom right conductor positioned at the right side in a bottom phase transmission line by a first interphase spacer made of an insulator; and connecting a top right conductor positioned at the right side in the top phase transmission line and a bottom left conductor positioned at the left side in the bottom phase transmission line by a second interphase spacer made of an insulator, wherein said steps of connecting includes the steps of connecting said top left conductor and said top right conductor which both extend along a first horizontal level to form said top phase transmission line, and connecting said bottom left conductor and said bottom right conductor which both extend along a second horizontal level to form said bottom phase transmission line, said first and second interphase spacers being separate from each other;

naturally rotating in a first direction said top left conductor when ice forms thereon, while naturally rotating in a second direction said bottom right conductor when ice forms thereon and when wind strikes said multiconductor transmission line, said first direction being opposite from said second direction;

naturally rotating in said first direction said bottom left conductor when ice forms thereon, while naturally rotating in said second direction said top right conductor when ice forms thereon and when wind strikes said multiconductor transmission line; and thereafter suppressing galloping of said multiconductor transmission line.

2. The method of suppressing galloping of a multiconductor transmission line as set forth in claim 1, wherein at least one of the first or second interphase spacers is formed by integrally molding a polymer insulator around a fiber reinforced plastic rod.

3. The method of suppressing galloping of a multiconductor transmission line as set forth in claim 1, wherein the first interphase spacer and the second interphase spacer are attached separated from each other to give an distance between the interphase spacers of 0.5 to 5 meters along the direction of the transmission lines.

4. A method of suppressing galloping of a multiconductor transmission line, comprising the steps of:

connecting a top left conductor positioned at the left side in a top phase transmission line and an intermediate right conductor positioned at the right side in an intermediate phase transmission line by a first interphase spacer made of an insulator;

connecting a top right conductor positioned at the right side in the top phase transmission line and an intermediate left conductor positioned at the left side in the intermediate phase transmission line by a second interphase spacer made of an insulator;

connecting the intermediate left conductor and a bottom right conductor positioned at the right side in a bottom phase transmission line by a third interphase spacer made of an insulator;

a step of connecting the intermediate right conductor and a bottom left conductor positioned at the left side in the bottom phase transmission line by a fourth interphase spacer made of an insulator, wherein said steps of connecting include the steps of connecting said top left conductor and said top right conductor to form said top phase transmission line extending along a first horizontal level, connecting said intermediate left conductor and said intermediate right conductor to form said intermediate phase transmission line extending along a second horizontal level, and connecting said bottom left conductor and said bottom right conductor to form said bottom phase transmission line extending along a third horizontal level, and wherein said first, second and third interphase spacers are separate from each other;

naturally rotating in a first direction said top left conductor when ice forms thereon, while naturally rotating in a second direction said intermediate right conductor when ice forms thereon and when wind strikes said multiconductor transmission line, said first direction being opposite from said second direction;

naturally rotating in said first direction said intermediate left conductor when ice forms thereon, while naturally rotating in said second direction said top right conductor when ice forms thereon and when wind strikes said multiconductor transmission line; and thereafter suppressing galloping of said multiconductor transmission line.

5. The method of suppressing galloping of a multiconductor transmission line as set forth in claim 4, wherein at least one of the first to fourth interphase spacers is formed by integrally molding a polymer insulator around a fiber reinforced plastic rod.

6. The method of suppressing galloping of a multiconductor transmission line as set forth in claim 4, wherein the first interphase spacer and the second interphase spacer are attached separated from each other to give an distance between the interphase spacers of 0.5 to 5 meters along the direction of the transmission lines; the third interphase spacer and the fourth interphase spacer are attached separated from each other to give an distance between the interphase spacers of 0.5 to 5 meters along the direction of the transmission lines; and the second interphase spacer and the third interphase spacer are attached separated from each other to give an distance between the interphase spacers of at least 10 meters along the direction of the transmission lines.

7. A method of suppressing galloping of a multiconductor transmission line, comprising the steps of:

connecting a top left group of conductors positioned at the left side in a top phase transmission line and a bottom right group of conductors positioned at the right side in a bottom phase transmission line by a first interphase spacer made of an insulator;

connecting a top right group of conductors positioned at the right side in the top phase transmission line and a bottom left group of conductors positioned at the left side in the bottom phase transmission line by a second interphase spacer, wherein the steps of connecting include the step of connecting a conductor of said top left group of conductors and an opposing conductor of said top right group of conductors along a first horizontal level, and the step of connecting a conductor of said bottom left group of conductors and an opposing conductor of said bottom right group of conductors along a second horizontal level, and wherein said first, second and third interphase spacers are separate from each other;

naturally rotating in a first direction said top left group of conductors when ice forms thereon, while naturally rotating in a second direction said bottom right group of conductors when ice forms thereon and when wind strikes said multiconductor transmission line, said first direction being opposite from said second direction;

naturally rotating in said first direction said bottom left group of conductors when ice forms thereon, while naturally rotating in said second direction said top right group of conductors when ice forms thereon and when wind strikes said multiconductor transmission line; and thereafter suppressing galloping of said multiconductor transmission line.

8. The method of suppressing galloping of a multiconductor transmission line as set forth in claim 7, wherein at least one of the first and second interphase spacers is formed by integrally molding a polymer insulator around a fiber reinforced plastic rod.

9. The method of suppressing galloping of a multiconductor transmission line as set forth in claim 7, wherein the first interphase spacer and the second interphase spacer are attached separated from each other to give an distance between the interphase spacers of 0.5 to 5 meters along the direction of the transmission lines.

10. The method of suppressing galloping of a multiconductor transmission line as set forth in claim 7, wherein the ends of at least one of the first and second interphase spacers are connected through mounting adapters to the group of conductors.

11. A method of suppressing galloping of a multiconductor transmission line, comprising the steps of:

connecting a top left group of conductors positioned at the left side in the top phase transmission line and an intermediate right group of conductors positioned at the right side in an intermediate phase transmission line by a first interphase spacer made of an insulator;

connecting a top right group of conductors positioned at the right side in the top phase transmission line and an intermediate left group of conductors positioned at the left side in the intermediate phase transmission line by a second interphase spacer made of an insulator;

connecting the intermediate left group of conductors and a bottom right group of conductors positioned at the right side in a bottom phase transmission line by a third interphase spacer made of an insulator;

connecting the intermediate right group of conductors and a bottom left group of conductors positioned at the left side in the bottom phase transmission line by a fourth interphase spacer made of an insulator, wherein the steps of connecting include the step of connecting a conductor of said top left group of conductors and an opposing conductor of a top right group of conductors along a first horizontal level, the step of connecting a conductor of said intermediate left group of conductors and an opposing conductor of said intermediate right group of conductors along a second horizontal level, and the step of connecting a conductor of said bottom left group of conductors and an opposing conductor of said bottom right group of conductors along a third horizontal level, and wherein said first, second, third and fourth interphase spacers are separate from each other;

naturally rotating in a first direction said top left group of conductors when ice forms thereon, while naturally rotating in a second direction said intermediate right group of conductors when ice forms thereon and when wind strikes said multiconductor transmission line, said first direction being opposite from said second direction;

naturally rotating in said first direction said intermediate left group of conductors when ice forms thereon, while naturally rotating in said second direction said top right group of conductors when ice forms thereon and when wind strikes said multiconductor transmission line; and thereafter suppressing galloping of said multiconductor transmission line.

12. The method of suppressing galloping of a multiconductor transmission line as set forth in claim 11, wherein at least one of the first to fourth interphase spacers is formed by integrally molding a polymer insulator around a fiber reinforced plastic rod.

13. The method of suppressing galloping of a multiconductor transmission line as set forth in claim 11, wherein the first interphase spacer and the second interphase spacer are attached separated from each other to give an distance between the interphase spacers of 0.5 to 5 meters along the direction of the transmission lines; the third interphase spacer and the fourth interphase spacer are attached separated from each other to give an distance between the interphase spacers of 0.5 to 5 meters along the direction of the transmission lines; and the second interphase spacer and the third interphase spacer are attached separated from each other to give an distance between the interphase spacers of at least 10 meters along the direction of the transmission lines.

14. The method of suppressing galloping of a multiconductor transmission line as set forth in claim 11, wherein the ends of the first to fourth interphase spacers are connected through mounting adapters to the group of conductors.

15. A method of suppressing galloping of a multiconductor transmission line, comprising the steps of:

connecting a bottom conductor positioned at the bottom side in a first phase transmission line and a top conductor positioned at the top side in a second phase transmission line by a first interphase spacer made of an insulator;

connecting a top conductor positioned at the top side in the first transmission line and a bottom conductor positioned at the bottom side in the second phase transmission line by a second interphase spacer, wherein said first and second interphase spacers are separate from each other;

naturally rotating in a first direction said top left conductor when ice forms thereon, while naturally rotating in a second direction said bottom right conductor when ice forms thereon and when wind strikes said multiconductor transmission line, said first direction being opposite from said second direction;

naturally rotating in said first direction said bottom left conductor when ice forms thereon, while naturally rotating in said second direction said top right conductor when ice forms thereon and when wind strikes said multiconductor transmission line; and thereafter suppressing galloping of said multiconductor transmission line.

16. The method of suppressing galloping of a multiconductor transmission line as set forth in claim 15, wherein at least one of the first and second interphase spacers is formed by integrally molding a polymer insulator around a fiber reinforced plastic rod.

17. The method of suppressing galloping of a multiconductor transmission line as set forth in claim 15, wherein the first interphase spacer and the second interphase spacer are attached separated from each other to give an distance between the interphase spacers of 0.5 to 5 meters along the direction of the transmission lines.

18. A method of suppressing galloping of a multiconductor transmission line, comprising the steps of:

connecting a bottom group of conductors positioned at the bottom side in a first phase transmission line and a top group of conductors positioned at the top side in a second phase transmission line by a first interphase spacer made of an insulator;

connecting a top group of conductors positioned at the top side in the first transmission line and a bottom group of conductors positioned at the bottom side in the second phase transmission line by a second interphase spacer, wherein said first and second interphase spacers are separate from each other;

naturally rotating in a first direction said top left conductor when ice forms thereon, while naturally rotating in a second direction said bottom right conductor when ice forms thereon and when wind strikes said multiconductor transmission line, said first direction being opposite from said second direction;

naturally rotating in said first direction said bottom left conductor when ice forms thereon, while naturally rotating in said second direction said top right conductor when ice forms thereon and when wind strikes said multiconductor transmission line; and thereafter suppressing galloping of said multiconductor transmission line.

19. The method of suppressing galloping of a multiconductor transmission line as set forth in claim 18, wherein at least one of the first and second interphase spacers is formed by integrally molding a polymer insulator around a fiber reinforced plastic rod.

20. The method of suppressing galloping of a multiconductor transmission line as set forth in claim 18, wherein the first interphase spacer and the second interphase spacer are attached separated from each other to give an distance between the interphase spacers of 0.5 to 5 meters along the direction of the transmission lines.

21. The method of suppressing galloping of a multiconductor transmission line as set forth in claim 18, wherein the ends of at least one of the first and second interphase spacers are connected through mounting adapters to the group of conductors.

* * * * *